United States Patent [19]
Dobry

[11] Patent Number: 6,080,329
[45] Date of Patent: Jun. 27, 2000

[54] PARTICULATE COOLING MEDIA AND PADS CONTAINING THE SAME

[76] Inventor: Reuven Dobry, 87 Rolling Wood, Stamford, Conn. 06905

[21] Appl. No.: 09/221,090

[22] Filed: Dec. 28, 1998

[51] Int. Cl.[7] .................................................. C09K 5/00
[52] U.S. Cl. .............................. 252/70; 106/13; 165/10; 165/920
[58] Field of Search ............................ 252/70; 165/920, 165/10; 106/13

[56] References Cited

U.S. PATENT DOCUMENTS

| | | | |
|---|---|---|---|
| 3,298,804 | 1/1967 | Schoch | 44/500 |
| 3,794,472 | 2/1974 | Macaluso et al. | 44/502 |
| 4,117,214 | 9/1978 | Parks et al. | 427/220 |
| 4,312,901 | 1/1982 | Kekish et al. | 252/70 |
| 4,937,412 | 6/1990 | Dobry | 219/10.55 M |
| 5,211,949 | 5/1993 | Salyer | 424/402 |
| 5,282,994 | 2/1994 | Salyer | 252/70 |
| 5,314,005 | 5/1994 | Dobry | 165/10 |
| 5,417,276 | 5/1995 | Dobry | 165/10 |

*Primary Examiner*—Anthony Green

[57] ABSTRACT

This invention employs discrete, free-flowing particles as substrates for the absorption of water as a phase changing, thermal payload. The aqueous payloads are retained in the particles as they cycle between freezing and thawing, delivering and absorbing sensible and latent heat. Extraparticualate additives in the form of finely divided hydrophobic solids prevent the particles from freezing together into a solid block in preparation for their use as a cooling agent. With free-flowing properties thus secured over a wide temperature range, cooling media of this invention are particularly suitable for healthcare applications.

12 Claims, 1 Drawing Sheet

PARTICULATE COOLING MEDIA AND PADS CONTAINING THE SAME

BACKGROUND OF THE INVENTION

1. Technical Field

This invention concerns materials which can serve as intermediate agents for transfer of heat from an energy source to a load object. More specifically, it relates to granular compositions of matter which are particularly suitable for cooling applications.

2. Description of the Related Art

In a typical heating application, agent Y receives heat from source X and then delivers its stored heat to load object Z. The same applies, in principle, to a cooling application. In that case, agent Y receives cold from (gives up its heat to) source X and then delivers its cold to (receives heat from) load object Z. In other words, one may consider the load object of cold as a source of heat and the source of cold as the load object of heat. Similarly, cold may be considered as a deficit of heat or negative heat. While intermediate agents of heat transfer play a like role in heating and cooling, this invention focuses upon the latter.

Water is commonly used as a cooling agent because it is readily available, inexpensive and entirely safe to use in its liquid or frozen state. In terms of functional properties, it also possesses high specific heat and high heat of melting/freezing. Thus, heat withdrawn from water as it is cooled and frozen, is ultimately reabsorbed by the water when it is used as a cooling agent, en route back to ambient temperature. The total cooling effect is the sum of sensible heat absorbed by ice and water plus the latent heat consumed by the process of melting.

Familiar examples of cooling applications, with water, include ice cubes chilling a beverage and perishables preserved in crushed ice. They demonstrate the basic elements necessary for effective cooling; namely, direct contact and substantial immersion of the cooling object in the cooling medium. The concurrent effects of these cooling applications are not undesirable. In the first case, melted ice mingles integrally with its cooling object and becomes part of the beverage. In the second, surface water from the melting ice promotes heat transfer and keeps the cooling objects rinsed fresh and clean.

There are, of course, many cases where direct contact between cooling medium and cooling object are not desirable. Various methods of water containment have begin devised for such applications. They include, ice bags, freezer packs and the like. Most of them comprise water, aqueous compositions or gels of either, hermetically sealed in a rigid or flexible, ostensibly leak proof container, sized and shaped for its intended use. These forms of containment essentially preclude immersion of cooling object in a cooling medium, a subject which will be revisited later. In addition, there is always some risk of damage to the containers and loss of cooling medial.

Other methods of containment involve the disposition of water into small, liquid absorbent, solid particles. This approach retains tile desirable thermal properties of water, albeit somewhat diluted and proportionally diminished by the solid carrier. It eliminates the dangler of water leakage per se. However, it still requires appropriate containment of the solid particles for most practical applications. It also requires vapor tight containment to prevent loss of water by evaporation.

To better understand the present invention in light of prior art, it is important to make a clear distinction between conformability and free flowing properties of a particulate solid. The latter may otherwise be referred to as flowability. Any aggregate of discrete particles in a flexible container is conformable; i.e. it may be bent and shaped manually to fit around another object. Flowability, on the other hand, does not necessarily require manipulation. It comes into play under the influence of gravity, as discrete particles tumble and flow freely, when contained loosely, to surround any underlying object. Free flowing properties are particularly important in a healthcare application, where heating or cooling pads need to drape around parts of the body.

In U.S. Pat. Nos. 5,211,949 and 5,282,994, Salyer teaches the absorption of water, among other phase change materials, into submicron particles of silica. The particles range in size from 0.005 to 0.25 microns, typically 0.022 microns. The resulting composition contains about 60–70% water and 40–30% silica, or a payload of 150% to 233% water based on the weight of the silica substrate. This powder-like formulation is claimed to be surface dry, comfortable and free flowing down to freezer temperature, properties highly desirable for cooling applications. Cooling media of this prior art are indeed conformable as claimed. However, because of their light bulk density and fine, dust-like character, they do not possess that decided gravitational flowability which is most desirable for healthcare applications. Moreover, the dusty character of this medium preclude heating or cooling applications which might involve direct immersion of a load object into the heat transfer medium.

The use of discrete particulate heating/cooling agents is disclosed by this applicant in U.S. Pat. Nos. 4,937,412, 5,314,005 and 5,417,276. The preferred substrate in that technology consists of activated alumina in the form of spherical beads ranging in size from $\frac{1}{32}$" to $\frac{1}{8}$" in diameter. The beads contain microwave responsive payloads, predominantly non-volatile, which are absorbed in the beads and retained therein by capillary forces. Uniformity of shape and surface smoothness, combined with high bulk density, produce flowability ideally suited for healthcare applications. These particulate media were intended mainly for heating pads, which only incidentally doubled for cooling. That precluded payloads composed primarily of water, sine the latter would evaporate and be lost in successive heat applications.

A subsequent development program of the same technology attempted to capitalize on the thermal properties of water as a phase changing payload solely for cold applications. Beads of activated alumina were loaded with pure water and the resulting composition appeared to be surface dry and high in bulk density, with potential flowability highly desirable for healthcare cooling applications. Unfortunately, these desirable free flowing properties did not survive storage in a freezer in preparation of the beads for experimental cooling applications. Evidently moisture reaching the surface of the beads resulted in a solid frozen mass.

The prior art has addressed similar problems, i.e. particle freezeup due to surface moisture, by coating the particles with liquid hydrocarbons or by using water soluble additives to weaken ice which does form. This invention takes an entirely different approach. It employs finely divided, hydrophobic solids dispersed between the particles to disrupt the buildup of integral ice formations which would otherwise bind the particle together into a frozen mass.

Accordingly, the object of this invention is to propose granular heat transfer media dedicated solely to cooling applications. The proposed media take full advantage of water as change-of-phase payload, with its free flowing properties preserved from ambient to sub-freezing temperatures.

SUMMARY OF THE INVENTION

The present invention discloses particulate compositions which can be used as cooling media, effectively and repeatedly. The particulates are made of highly absorptive solid particles saturated with water, thereby taking maximum advantage of water as a phase changing payload. The particles are surrounded by a finely divided hydrophobic solid which prevents the buildup of coherent ice crystals and formation of a solid block upon storage in a freezer in preparation for a subsequent cooling application. It also enhances the flowability of the particles above the freezing point of water. With free flowing properties thus secured at all temperatures, the particulate compositions of this invention may be used, suitably contained, for most cooling applications. They may also be used as a cooling medium, via direct immersion of a load object, in special applications.

BRIEF DESCRIPTION OF THE DRAWINGS

The FIGURE is a schematic section of a cooling pad containing the particulate media according to the invention.

DETAILED DESCRIPTION AND SPECIFICATION OF THE INVENTION

Figure 1:
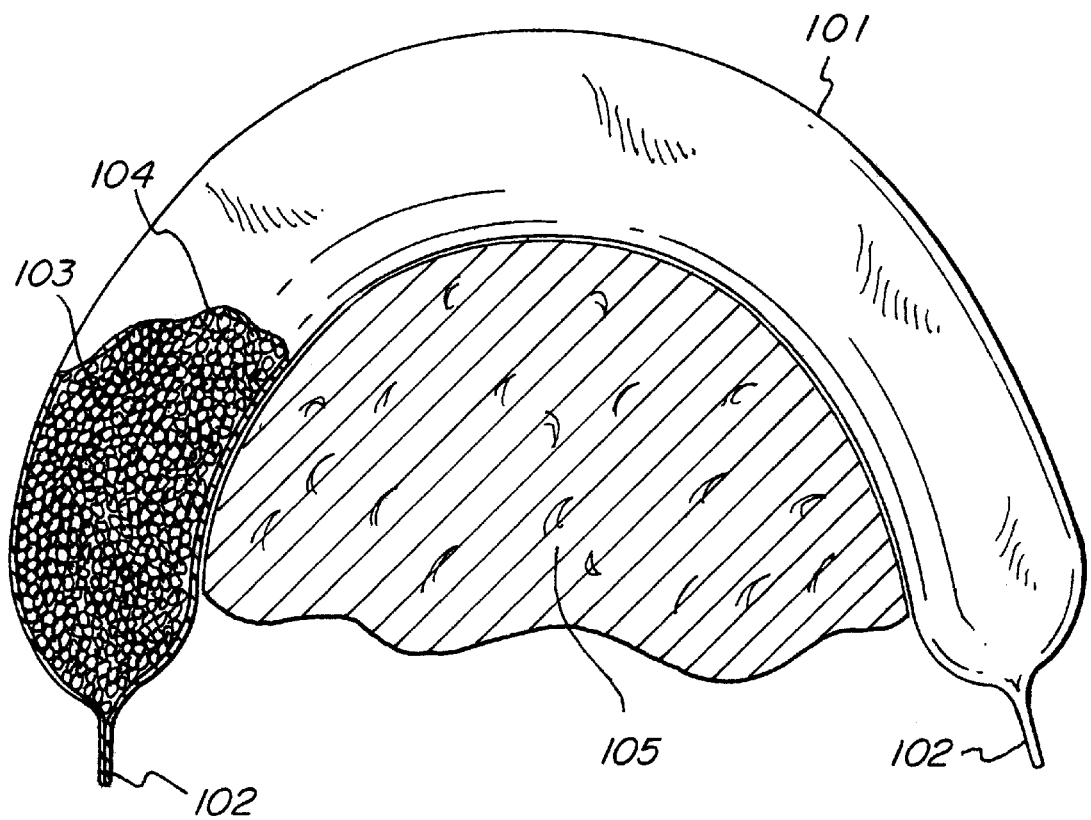

The solid component of the particulate (tooling media may be any porous material which readily absorbs substantial amounts of water or aqueous compositions while remaining essentially surface dry. Examples of such materials, preferably inert minerals, include vermiculite and activated alumina.

Vermiculite has been considered for this purpose because of its low cost and high absorptive capacity for water. This material serves well as a substrate. However, randomness of particle size and shape, as well as low density, limit its free flowing and draping properties. Still, it may be entirely satisfactory in cases where conformability is sufficient.

Activated alumina is a more desirable substrate because it is available in the form of smooth-surfaced, spherical beads. The beads' high specific surface of 330 $m^2$/gram is important for its conventional use as an adsorbent and catalyst carrier. However, the material also has a great affinity and high absorptive capacity for water. The property of void volume, normally exceeding 0.5 cc/gram, plays a key role in this regard because it is available to be filled by water. The rate of water absorption is controlled and limited somewhat by the tight porosity and narrow channels necessary to produce its high specific surface. In spite of that, the material is perfectly acceptable as a substrate for this invention. For the purpose of later reference, let us refer to it as type C alumina, denoting "conventional".

To improve the rate of water absorption and total absorptive capacity, it is desirable to increase the porosity and void volume of the alumina substrate. For the sake of comparison, let us denote such a substrate as type M alumina, denoting "modified". It so happens that intensive thermal treatment of the type C substrate produces non-reversible changes which result in the collapse of small pores to form larger ones; i.e. type M substrate. Aluminum Corp. of America, makers of the type C alumina, have provided test quantities of the type M alumina for the development of this invention.

Information provided by ALCOA indicates that Type M substrates typically differs from Type C in the nature of their porous structure and related properties, by test methods standard in the alumina industry as follows:

|  | Type C | Type M |
|---|---|---|
| Particle size, Tyler | 7–14 mesh | 7–14 mesh |
| Bulk density lbs/$ft^3$ | 38.5 | 35.0 |
| Particle density lbs/$ft^3$ | 4.2 | 58.3 |
| Specific surface $m^2$/gm | 330 | 107 |
| Mesoporosity, cc/gm 30–750 angstrom pores | 0.18 | 0.36 |
| Macroporosity, cc/gm 750 angstrom pores | 0.33 | 0.45 |
| Total porosity, cc/gm | 0.51 | 0.81 |
| Avg. Pore Diameter, angstrom | 62 | 303 |

Thus any modified activated alumina with a total porosity greater than 0.6 cc/gn and a specific area smaller than 250 $m^2$/gm would be preferable substrates for this invention.

In process of making the particulates of this invention, water is first absorbed into the substrate as close to saturation as possible. This is done by tumble mixing a botch of substrate with a proportional quantity of water until the latter is fully absorbed. The amount of water and time of mixing appropriate to each substrate is determined by experience. Absorption is complete when the mixture become free tumbling and substantially surface dry to the eye and touch. Clearly, freezing point depressing solutes may be used with the water, if desired, as long as they do not adversely affect the sensible and latent heat of the payload.

One might be tempted to use the loaded particles as cooling agents at this stage in the process. However, attempts to do so have been unsuccessful. Problems emerge as the material is prechilled in a freezer for later use. Although the particles appear to be perceptibly dry at this point, moisture tends to migrate to the surface during the freezing process. The result is a frozen mass which cannot be easily broken. Without its conformability and flowability, the material is totally unacceptable for its intended use.

The problem is circumvented in this invention by intermingling the particles with a finely divided water repellent solid. Typical examples of such ingredients, in order of decreasing effectiveness, include treated (hydrophobic) fumed silica, calcium stearate (−325 mesh) and talc (2 micron size). The variety of substances which work in this connection attests to the fact that water repellency (non-wettability), not similarity of chemical structure, is the key to their effectiveness. This is confirmed by the fact that untreated (hydrophilic) fumed silica does not produce the desired effect. Direct attachment of the substances in question to the particles is not intended, neither is it necessary for their performance. They work simply by their presence and intercession between the particles.

As little as 0.2% of additive, based on the weight of water saturated heads of activated alumina, is sufficient to prevent particle freezeup. To other words, a mere dispersion or dusting of the finely divided additive, can produce the desired objective. Expectedly, vermiculite particles require higher dosages of additives, about 2 to 3 times higher, because their surfaces are irregular and areas of contact, particle surface per unit weight, are greater.

Advantages of this invention over the prior art are threefold. First, it entails the use of inherently lower dosages of additives, because the surfaces of the particles need not be covered by the water repellent agent. Second and relatedly, because the surfaces of the particles are not covered by a moisture barrier, water which happens to migrate out of the particles during the freezing process can be reabsorbed by the particles in the thaw stage of any freeze/thaw cycle. Last but not least, the water repellent additives of this invention possess lubricating properties which improve the flowability of the particles above the freezing point of water. Incidental surface moisture during the thawing step tends to coalesce and impede the free flowing properties of tile particles if such coalescing is not deterred by the presence of the finely divided water repellent solid.

Accordingly, the final step in the process of making the particulates of this invention is addition of the water repellent ingredient. This is done by adding a proportional quantity of the finely divided solid to the liquid laden particles and resuming the tumble blending. The dosage of this ingredient as well as time of the final mixing, depend on the materials in question. These too are determined by experience. Adequate blending is achieved when the resulting particles possess flowability and/or conformability which survive the freezing process. It is noteworthy, in this connection, that any agglomeration which occasionally does occur in the freezer is clearly superficial. It breaks apart easily under gentle pressure. Full conformability and flowability are thus restored prior to any intended cooling application.

Each substrate changes its physical properties as it undergoes formulation. Vermiculite typically absorbs water up to 200% of its neat weight, while changing its bulk density from 0.12 to 0.36 gm/cc. Type C alumina typically absorbs water, albeit slowly, up to 65–72% of its neat weight, while changing in bulk density from 0.62 to 0.95 gm/cc. Type M alumina typically absorbs water, more readily, up to 72–77% of its neat weight, while undergoing a change in bulk density from 0.56 to 0.96 gm/cc.

Upon closer comparison of the substrates, it is clear that the vermiculite-based particles contain more water per unit weight than the alumina-based formulation, respectively 67% vs. 43%. The alumina-based particles, on the other hand, contain more water per unit volume of bed; i.e. 0.41 gm/cc vs. 0.24 gm/cc, respectively. Water content, of course, determines the cooling potential of each formulation. Another factor, bulk density, relates to the space required to accommodate a specific working load for a specific cooling function. Last but not least, properties of conformability and flowability also vary with the substrate, depending on its bulk density, as well as size and shape of its particles. While conformability is the least one can expect of vermiculite, the unique flowability of alumina beads is clearly advantageous for most applications. All of the above factors are important in selecting cooling media for specific uses.

The final consideration, the manner in which these particulate cooling media are to be used, is he question of appropriate containment. For most applications the media are best contained loosely in a pouch flexible enough to take full advantage of drapeability. The pouch, be it film or laminate, should obviously be vapor impervious to prevent loss of water by evaporation. The outer surface of the pouch should be suitable for direct contact with the cooling object. It should also be treated, if at all possible, to minimize water condensation from ambient humidity.

FIG. 1 is a schematic section of a cooling pad containing the particulate media of this invention. It consists of a flexible outer pouch 101, with hermetic seals 102 and vapor tight composition designed to prevent loss of moisture from the pad. The pouch contains watersaturated particles 103 interspersed with an interparticulate dusting of water repellent additive 104. It is to be understood that the particles shown in part of the pouch actually fill most of the pouch with a deliberate slack sufficient to allow for drapeability. The pad is shown draped around load object 105, typically any part of the body in need of therapeutic cooling.

Another important feature which distinguishes this invention from the prior art is the opportunity and capability of immersing a load object directly into the cooling medium. Discrete particles of the prior art are much too dusty and likely to adhere to an immersed object. Particles of this invention, especially those based on alumina beads are clearly suitable for direct immersion. Such a cooling medium could conceivably be maintained briefly in an open container, ready to receive a load object such as a body extremity in need of intensive cooling. The cooling effect, governed by heat transfer between particles, is likely to be less painful and more comfortable than that obtained from crushed ice or iced water; in other words, measured and dry.

Various aspects of this invention will become more evident from the specific examples which follow.

EXAMPLE 1

Spherical beads of type C activated alumina, available from ALCOA as grade LD-5, were determined to contain about 9.1%, moisture as received. To 110 grams of the alumina, consisting of 100 grams of dry solids and 10 grams of water, were added 62 grams of water, thereby creating a payload of 72 grams of water per 1.00 grams dry weight. The mixing was done in a glass jar which was capped immediately. The added water was absorbed into the beads in 55 minutes with occasional agitation. The water-laden beads were transferred to a Ziploc plastic bag and placed in a freezer for several hours, wherein they froze to a solid mass.

EXAMPLE 2

The beads of example 1 were thawed out completely and returned to the glass jar. About 0.7 grams of −325 mesh calcium stearate (supplied by Whittaker Clark & Daniels Inc.) was added to then wetted beads (172 grams), mixed thoroughly, transferred back to the Ziploc bag and returned to the freezer. The reformulated beads did not freeze to a solid mass in any one of several repetitive freeze-thaw cycles, remaining free-flowing at all times. This demonstrated that 0.4% of the calcium stearate based on the wetted beads or less is sufficient to prevent the freezeup.

EXAMPLE 3

A repetition of Examples 1 and 2 with the addition of 1.0 grams of Microtalc MP 15–38 (supplied by Specialty Minerals Inc.) demonstrated that a dosage of 0.6% talc or less is sufficient to prevent a solid freezeup, leaving the aggregate agglomerated but breakaible by mild pressure. Thus, talc appears to be the least effective of the agents tested.

EXAMPLE 4

Type M alumina beads, (supplied by ALCOA as grade LD-6), were predried by repeated microwaving to a constant dry weight. 100 grams of the dry heads were mixed in a glass jar with 77 grams of water and capped immediately. Absorption of the water was complete within 40 minutes with occasional mixing. The water-laden beads were transferred to a Ziploc bag and stored in the freezer overnight wherein they Froze to a solid block.

EXAMPLE 5

The beads of Example 4 were thawed out completely, returned to the glass jar and blended with 0.35 grams of treated (hydrophobic) fumed silica CAB-O-SIL TS-720 obtained from the CABOT Corporation. The mixture was returned to the freezer in a Ziploc bag, whereupon it retained its flowability through several freeze-thaw cycles. This demonstrated that as little as 0.20% of fumed silica is sufficient to prevent the freezeup.

EXAMPLE 6

Similar experiments were performed with medium ground vermiculite, grade A-2 (supplied by Strong-Lite Products Corp.), as substrate. They demonstrated that conformability, if not flowaloility, of water-laden vermiculite, 200% water based on that dry substrate, can be secured through the prefreezing step by higher dosages of the additives, e.g. about 0.5% of treated fumed silica based on the wet weight of the vermiculite.

EXAMPLE 7

About 710 grams of beads from 4 batches formulated as in Example 5 were transferred to a larger Ziploc bag. They maintained their flowability after storage in a freezer overnight and remained cold to the touch for over an hour when maintained on a paper plate exposed to ambient air. When prefrozen again and the bag applied to the body, it produced an initial deep cold shock which was numbing but not painful, followed by sustained cooling afterwards for over 30 minutes. The cooling effect was enhanced by covering the bag with a towel externally, reversing the bag and/or mixing its contents.

The foregoing description is for the purpose of teaching the person of ordinary skill in the art how to practice the present invention. It is not intended to detail all of those obvious variations and alternatives which will become apparent to the skilled practitioner upon reading the description. It is intended, however, that all such variations and alternatives be included within the scope of the present invention which is defined by the following claims.

What is claimed is:

1. Particulate cooling media comprising:
   (a) discrete, free-flowing, solid mineral particles having a void volume greater than 0.5 cc/gram, which are highly porous and water absorbent;
   (b) water disposed in said particles up to their full saturation capacity; and
   (c) an additive of finely divided hydrophobic solid dispersed between the particles which is sufficient to intercede between the particles and thereby prevent extrapiculate moisture, if any, from freezing the particles together into a solid mass during freezer storage in preparation for a subsequent cooling application.

2. The particulate cooling media of claim 1 wherein said particles are granules of vermiculite.

3. The particulate cooling media of claim 1 wherein said particles are spherical beads of activated alumina.

4. The particulate cooling media of claim 3 wherein said spherical beads are approximately 7 to 14 in Tyler mesh size.

5. The particulate cooling media of claim 4 wherein said beads of activated alumina possess a total porosity greater than 0.6 cc/gm and a specific surface area smaller than 250 $m^2/gm$.

6. The particulate cooling media of claim 4 wherein said additive is calcium stearate.

7. The particulate cooling media of claim 6 wherein said calcium stearate is finely divided to less than 325 mesh size.

8. The particulate cooling media of claim 7 wherein said finely divided calcium stearate amounts to 0.4% or less based on the weight of the beads saturated with water.

9. Particulate cooling media comprising:
   (a) spherical beads of activated alumina approximately 7 to 14 in Tyler mesh size;
   (b) water absorbed in said beads to at least 65% by dry weight of the alumina; and
   (c) a dusting, between the beads, of a finely subdivided hydrophobic solid additive sufficient to intercede between the particles and thereby prevent surface moisture, if any, from freezing the beads together into a solid mass during freezer storage in preparation for a subsequent cooling application.

10. The particulate cooling media of claim 9 wherein said hydrophobic solid additive consists of talc.

11. The particulate cooling media of claim 9 wherein said hydrophobic solid additive consists of fumed silica which is treated to be hydrophobic.

12. The particulate cooling media of claim 9 wherein said hydrophobic solid additive consists of calcium stearate.

* * * * *

UNITED STATES PATENT AND TRADEMARK OFFICE
CERTIFICATE OF CORRECTION

PATENT NO.     : 6,080,329
DATED          : June 27, 2000
INVENTOR(S)    : Reuven Dobry It is certified that error appears in the above-identified patent and that said Letters Patent is hereby corrected as shown below:

Column 1,
Line 47, reads "begin" should read -- been --
Line 56, reads "medial" should read -- media --
Line 59, reads "tile" should read -- the --
Line 61, reads "dangler" should read -- danger --

Column 2,
Line 20, reads "comfortable" should read -- comformable --
Line 43, reads "sine" should read -- since --

Column 3,
Line 30, reads "(tooling" should read -- cooling --

Column 4,
Line 11, reads "4.2" should read -- 64.2 --
Line 23, reads "botch" should read -- batch --
Line 56, reads "heads" should read -- beads --
Line 57, reads "To" should read -- In --

Column 5,
Line 8, reads, "tile" should read -- the --
Line 52, reads "he" should read -- the --

Column 6,
Line 27, reads "1.00" should read -- 100 --
Line 38, reads "then" should read -- the --

Signed and Sealed this

Twenty-fifth Day of March, 2003

JAMES E. ROGAN
*Director of the United States Patent and Trademark Office*